United States Patent
Ioffe

(10) Patent No.: US 7,957,555 B2
(45) Date of Patent: Jun. 7, 2011

(54) METHOD AND APPARATUS FOR LOCALIZING AN OBJECT PART IN DIGITAL IMAGE DATA BY UPDATING AN INITIAL POSITION ESTIMATE BASED ON A DISPLACEMENT OF THE OBJECT PART

(75) Inventor: Sergey Ioffe, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 1173 days.

(21) Appl. No.: 11/349,205

(22) Filed: Feb. 8, 2006

(65) Prior Publication Data

US 2007/0183654 A1    Aug. 9, 2007

(51) Int. Cl.
  G06K 9/00     (2006.01)
  G06K 9/36     (2006.01)
(52) U.S. Cl. ........ 382/103; 382/117; 382/118; 382/286; 382/288; 382/291
(58) Field of Classification Search .................. None
  See application file for complete search history.

(56) References Cited

U.S. PATENT DOCUMENTS

| | | | | |
|---|---|---|---|---|
| 5,859,921 | A * | 1/1999 | Suzuki | 382/118 |
| 6,072,893 | A * | 6/2000 | Luo et al. | 382/117 |
| 6,873,912 | B2 * | 3/2005 | Shimomura | 701/301 |
| 2002/0136449 | A1 | 9/2002 | Park et al. | |
| 2005/0105780 | A1* | 5/2005 | Ioffe | 382/118 |
| 2005/0190963 | A1 | 9/2005 | Li | |

OTHER PUBLICATIONS

Etemad et al. (Discriminant analysis for recognition of human face images, J. Opt. Soc. Am. A, vol. 14, No. 8, Aug. 1997, pp. 1724-1733).*
Yoon, et al. (Real-time tracking and pose estimation for industrial objects using geometric features, Proceedings of the 2003 IEEE Int'l conf. on Robotics & Automation, Sep. 2003, pp. 3473-3478).*
Zamora et al. (Estimation of orientation and position of cervical vertebrae for segmentation with active shape models, Medical imaging 2001: Image processing, Proceedings of SPIE vol. 4322, 2001, pp. 378-387).*
Etemad et al.: "Discriminant analysis for recognition of human face images", J. Opt. Soc. Am. A/vol. 14, No. 8, 1997, pp. 1724-1733.*
Etemad et al.: "Discriminant analysis for recognition of human face images", J. Opt. Soc. Am. A/vol. 14, No. 8, 1997, pp. 1724-1733.*
Etemad et al.: "Discriminant analysis for recognition of human face images", J. Opt. Soc. Am. A/vol. 14, No. 8, 1997, pp. 1724-1733.*
Etemad et al.: "Discriminant analysis for recognition of human face images", J. Opt. Soc. Am. A/vol. 14, No. 8, 1997, pp. 1724-1733.*

* cited by examiner

*Primary Examiner* — Tom Y Lu
*Assistant Examiner* — Thomas A Conway
(74) *Attorney, Agent, or Firm* — Birch, Stewart, Kolasch & Birch, LLP

(57) ABSTRACT

A method and an apparatus localize an object part location in a digital image. The method according to one embodiment accesses digital image data containing an object part; obtains an initial position estimate for object part location of the object part; extracts a sub-image window around the initial position estimate of the object part location; calculates feature values based on pixel values within the sub-image window; and determines an updated position estimate for the object part location based on the calculated feature values.

24 Claims, 8 Drawing Sheets

METHOD AND APPARATUS FOR LOCALIZING AN OBJECT PART IN DIGITAL IMAGE DATA BY UPDATING AN INITIAL POSITION ESTIMATE BASED ON A DISPLACEMENT OF THE OBJECT PART

CROSS-REFERENCE TO RELATED APPLICATION

This non-provisional application is related to co-pending non-provisional application titled "Method and Apparatus for Estimating Object Part Location in Digital Image Data Using Feature Value Analysis" filed concurrently herewith, the entire contents of which are hereby incorporated by reference.

BACKGROUND OF THE INVENTION

1. Field of the Invention

The present invention relates to a digital image processing technique, and more particularly to a method and apparatus for locating objects in a digital image.

2. Description of the Related Art

Face recognition plays an important role in digital image processing techniques concerned with the study and processing of human faces. Face recognition systems can be included in security systems used in identification of people's identities; can help organize media such as photographs that include faces; etc.

When presented with images including people and objects, a known face recognition system identifies where people's faces are located in the images. The face recognition system then selects for processing only the faces of the people in the images. The task of face identification is complicated by non-face areas and objects present in images, as well as by variability in pose, lighting, expression, etc., of people's faces in images. Techniques to localize human faces in images can help a face recognition system identify which areas in an image are relevant. Moreover, techniques to localize human faces in images can be adapted for use in identifying many other types of objects besides faces. For example, such techniques could be used to identify buildings, trees, cars, etc.

A few publications have studied object identification in digital images. One such technique is described in US Patent Application 2002/0136449 A1 entitled "Apparatus and Method for Extracting Object Based on Feature Matching Between Segmented Regions in Images." The method described in this work extracts an object from an object extraction target image using pixel-based feature matching between the object extraction target image and a query image, which is a reference image of the object. The query and target images are segmented and matched based on features including color and texture. This method, however, is dependent on the existence of a reference image of an object, and in many cases such a reference image is not available.

Another technique for object identification in digital images is described in US Patent Application 2005/0190963 A1 entitled "Target Object Detecting Method, Apparatus, and Program." The method described in this work detects objects that are known to exist but have not been detected by other standard target object detection processes. A plurality of characteristic target object detecting processes, each corresponding to a predetermined specific characteristic of the target object, is performed to detect the target object. This method, however, uses predetermined characteristics of target objects, which might restrict the detection process and present challenges when presented with objects of variable characteristics, or with objects that do not feature the predetermined characteristics.

A disclosed embodiment of the application addresses these and other issues by utilizing a method and apparatus to localize a part of an object in a digital image. The method and apparatus calculate feature values of an object part to determine and refine a position estimate of the object part.

SUMMARY OF THE INVENTION

The present invention is directed to a method and an apparatus for localizing an object part in a digital image. According to a first aspect of the present invention, a method of localizing an object part in a digital image comprises: accessing digital image data containing an object part; obtaining an initial position estimate for object part location of the object part; extracting a sub-image window around the initial position estimate of the object part location; calculating feature values based on pixel values within the sub-image window; and determining an updated position estimate for the object part location based on the calculated feature values.

According to a second aspect of the present invention, an apparatus for localizing an object part in a digital image comprises: an image data unit for providing digital image data containing an object part; a sub-image analysis unit for extracting object part sub-images from the digital image data, the sub-image analysis unit extracting object part sub-images by obtaining an initial position estimate for object part location of the object part, and extracting a sub-image window around the initial position estimate of the object part location; and a feature values analysis unit for estimating object part location, the feature values analysis unit estimating object part location by calculating feature values based on pixel values within the sub-image window; and determining an updated position estimate for the object part location based on the calculated feature values.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
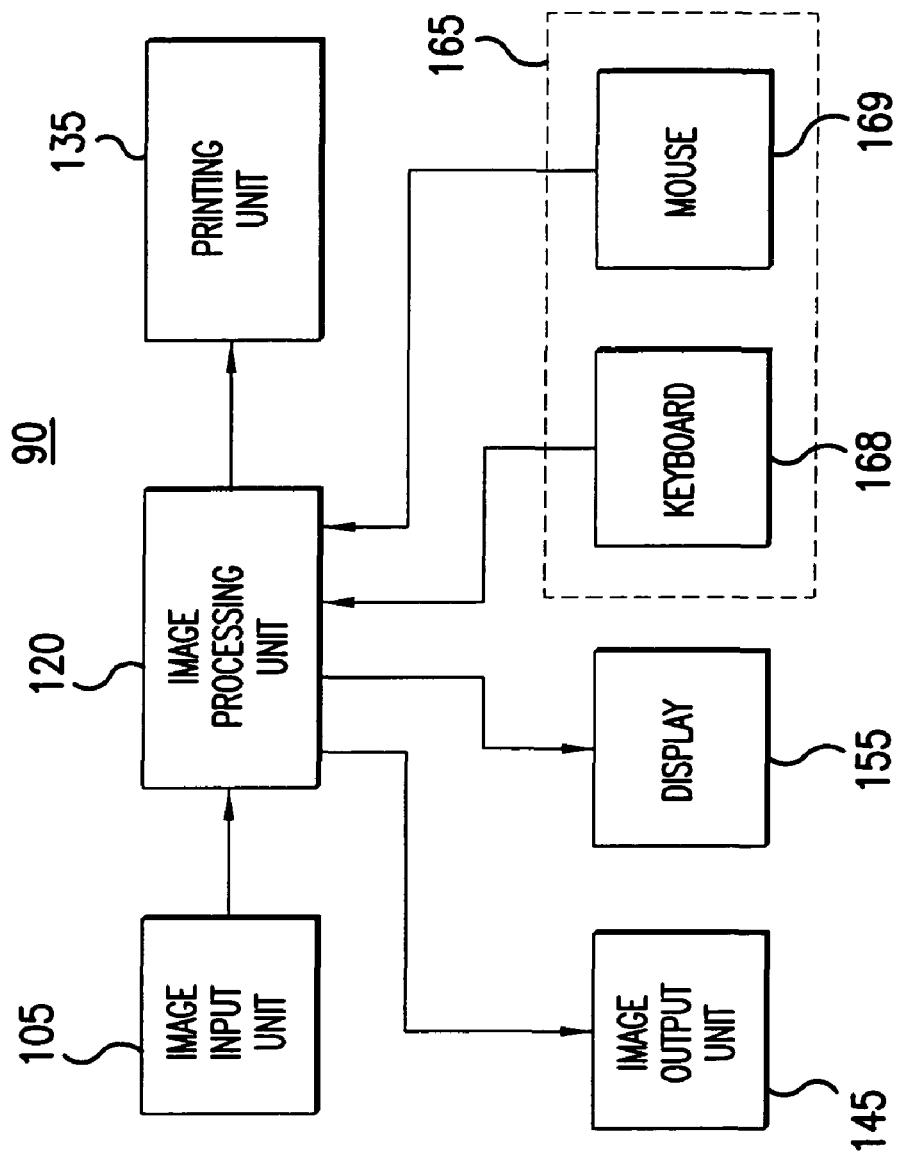
FIG. 1 is a general block diagram of a system including an image processing unit for localizing an object part in digital image data according to an embodiment of the present invention.

Aspects of the invention are more specifically set forth in the accompanying description with reference to the appended figures. FIG. 1 is a general block diagram of a system including an image processing unit for localizing an object part in digital image data according to an embodiment of the present invention. The system 90 illustrated in FIG. 1 includes the following components: an image input unit 105; an image processing unit 120; a display 155; an image output unit 145; a user input unit 165; and a printing unit 135. Operation of the system 90 in FIG. 1 will become apparent from the following discussion.

The image input unit 105 provides digital image data. The digital image data represents images that include objects and people. Image input unit 105 may be one or more of any number of devices providing digital image data, such as: a scanner for scanning images recorded on film; a digital camera; a recording medium such as a CD-R, a floppy disk, a USB drive, etc.; a database system which stores images; a network connection; an image processing system that outputs digital data, such as a computer application that processes images; etc.

The image processing unit 120 receives digital image data from the image input unit 105 and localizes objects in the digital image data in a manner discussed in detail below. A user, e.g., an operator at a security facility that uses face recognition systems, may view outputs of image processing unit 120, including intermediate results of object part location estimation, via display 155 and may input commands to the image processing unit 120 via the user input unit 165. In the embodiment illustrated in FIG. 1, the user input unit 165 includes a keyboard 168 and a mouse 169. In addition to localizing objects in digital image data in accordance with embodiments of the present invention, the image processing unit 120 may perform additional image processing functions, such as image correction functions, compression, etc. in accordance with commands received from the user input unit 165.

The printing unit 135 receives the output of the image processing unit 120 and generates a hard copy of the processed image data. Printing unit 135 may expose a light-sensitive material according to image data output by the image processing unit 120 to record an image on the light-sensitive material. The printing unit 135 may take on other forms, such as a laser printer. In addition or as an alternative to generating a hard copy of the output of the image processing unit 120, the processed image data may be output as an image file, e.g., via a portable recording medium or via a network (not shown). The output of image processing unit 120 may also be sent to an image output unit 145 that performs further operations on image data for various purposes.

Figure 2:
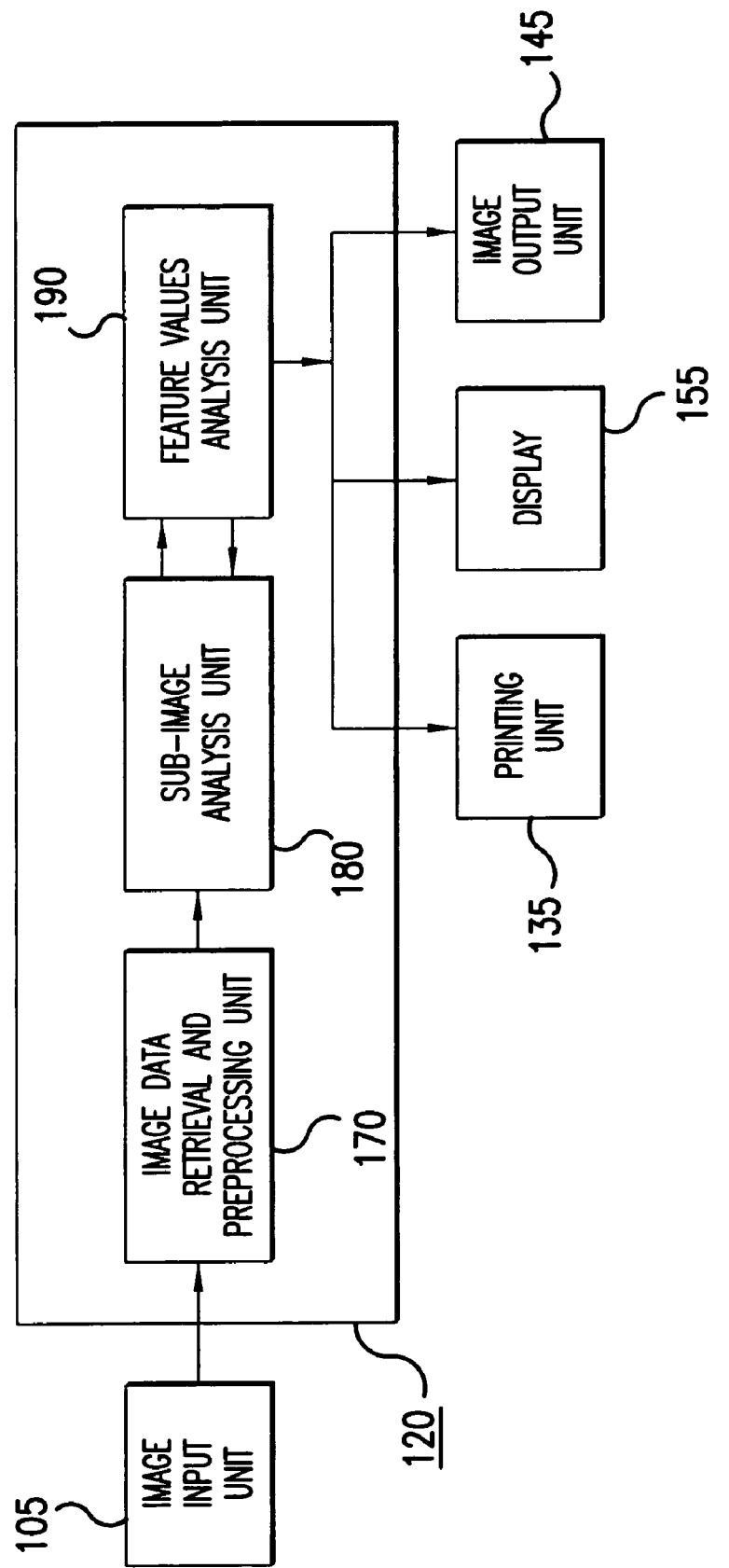
FIG. 2 is a block diagram of an image processing unit for localizing an object part in digital image data according to an embodiment of the present invention.

FIG. 2 is a block diagram of an image processing unit 120 for localizing an object part in digital image data according to an embodiment of the present invention. As shown in FIG. 2, the image processing unit 120 according to this embodiment includes: an image data retrieval and preprocessing unit 170; a sub-image analysis unit 180; and a feature values analysis unit 190. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 120 illustrated in FIG. 2 retrieves digital image data, performs preprocessing operations on digital image data, and localizes an object part in digital image data. Image data retrieval and preprocessing unit 170 receives digital image data from image input unit 105 and performs preprocessing operations on digital image data. Digital image data can be raw images that include various objects such as groups of people, buildings, etc. Preprocessing operations on digital image data may include resizing, cropping, image registration, etc.

An image included in the digital image data may contain objects such as faces, buildings, etc. An object part is a section of the image that includes a part of an object. As an example, in an image including a face as object, an object part can be an eye of the face. A sub-image of an image is a region that is connected to an object part by extending over or around the location of the object part. As an example, in an image including a face as object and an eye as an object part, a sub-image can be a region, or window, that includes the eye or a part of the eye.

Image data retrieval and preprocessing unit 170 sends preprocessed digital image data to sub-image analysis unit 180, which communicates with feature values analysis unit 190. Sub-image analysis unit 180 performs selection of object part sub-images and operations on sub-images in the digital image data. Feature values analysis unit 190 localizes an object part in digital image data using feature values associated with sub-images received from sub-image analysis unit 180. The output of feature values analysis unit 190 includes position estimates for one or more object parts in a digital image. Digital image data together with position estimates for one or more object parts may be output to image output unit 145, printing unit 135, and/or display 155.

Operation of the components included in the image processing unit 120 illustrated in FIG. 2 will be next described with reference to FIGS. 3-7. Image data retrieval and preprocessing unit 170, sub-image analysis unit 180, and feature values analysis unit 190 are software packages/applications.

Figure 3A:
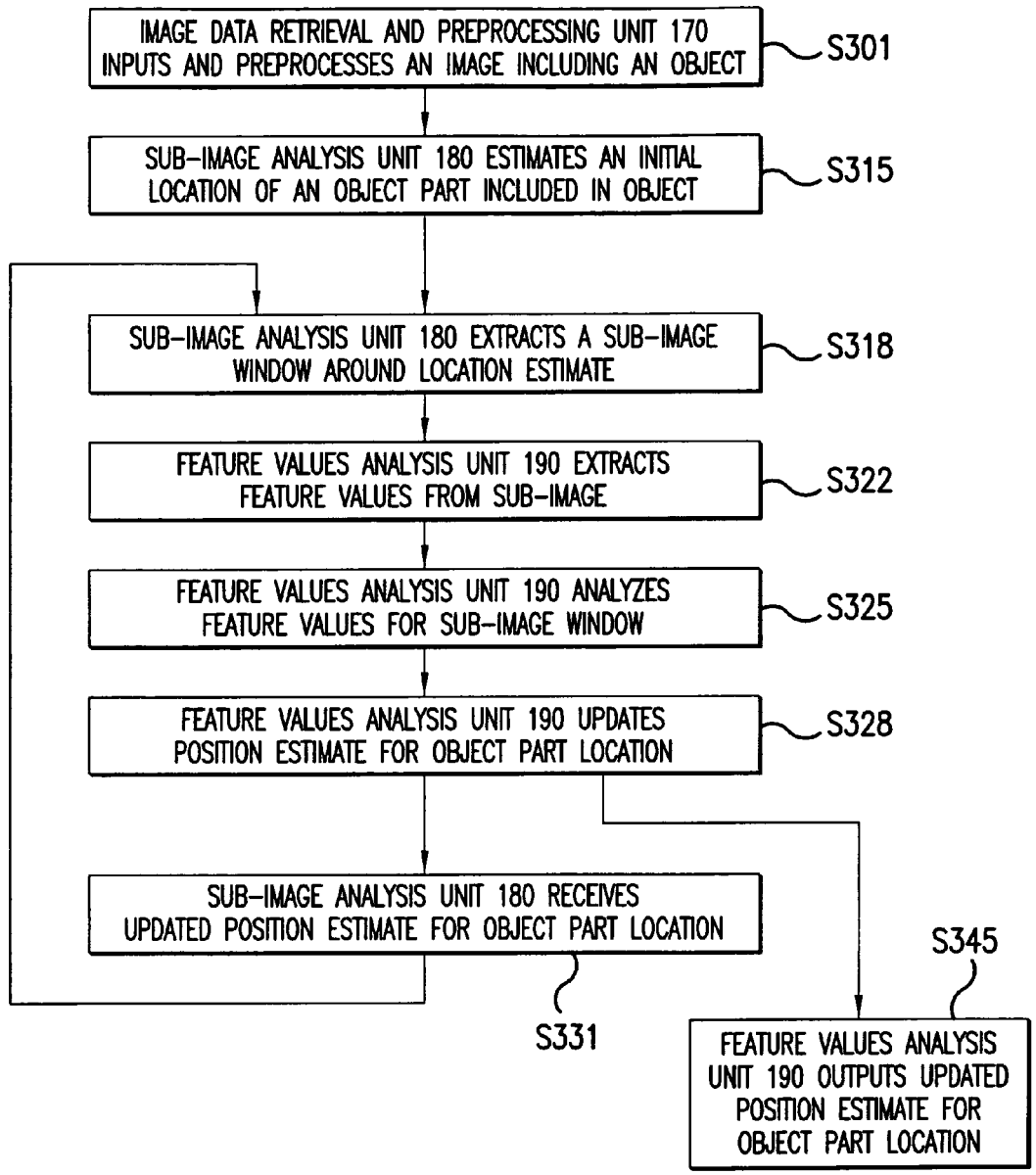
FIG. 3A is a flow diagram illustrating operations performed by an image processing unit for localizing an object part in digital image data according to an embodiment of the present invention illustrated in FIG. 2.

FIG. 3A is a flow diagram illustrating operations performed by an image processing unit 120 for localizing an object part in digital image data according to an embodiment of the present invention illustrated in FIG. 2. Image data retrieval and preprocessing unit 170 inputs and preprocesses an image including an object (S301). Preprocessing operations on the image may include image cropping, rotation, registration, etc. Sub-image analysis unit 180 receives the image including an object and estimates an initial location of an object part included in the object (S315). To obtain the initial location estimate, a "coarse" part detector is first applied to the object to roughly align the object. A previously determined ground truth position of the object part is then used to produce an initial estimate of the object part location. As an example, when the object is a face and the object part is a nose corner, the face is roughly normalized or aligned. The initial location estimate of the nose corner is a fixed position that was predetermined for a typical nose corner in a typical normalized face.

Sub-image analysis unit 180 next extracts a sub-image window around the location estimate (S318). Feature values analysis unit 190 receives the sub-image from sub-image analysis unit 180 and extracts feature values from the sub-image (S322). Feature values analysis unit 190 then analyzes the extracted feature values for the sub-image window (S325). Based on the feature analysis performed in step S325, feature values analysis unit 190 updates the position estimate for the object part location (S328). Feature values analysis unit 190 then sends the updated position estimate for object part location to sub-image analysis unit 180 (S331).

Having received an updated position estimate for the object part location, sub-image analysis unit 180 proceeds to extract a sub-image window around the updated location estimate (S318). Steps S318, S322, S325, S328 and S331 are repeated iteratively to refine the position estimate. The iteration stops when the position estimate is good enough. The number of iterations can be determined during testing of the image processing unit 120. In one implementation, 6 iterations were used. When it was determined that 3 iterations perform as good as 6 iterations, the number of iterations was reduced to 3. After the last iteration, feature values analysis unit 190 outputs a final position estimate for the object part location (S345). In one implementation, steps S318, S322, S325 and S328 are performed with sub-pixel accuracy.

Figure 3B:
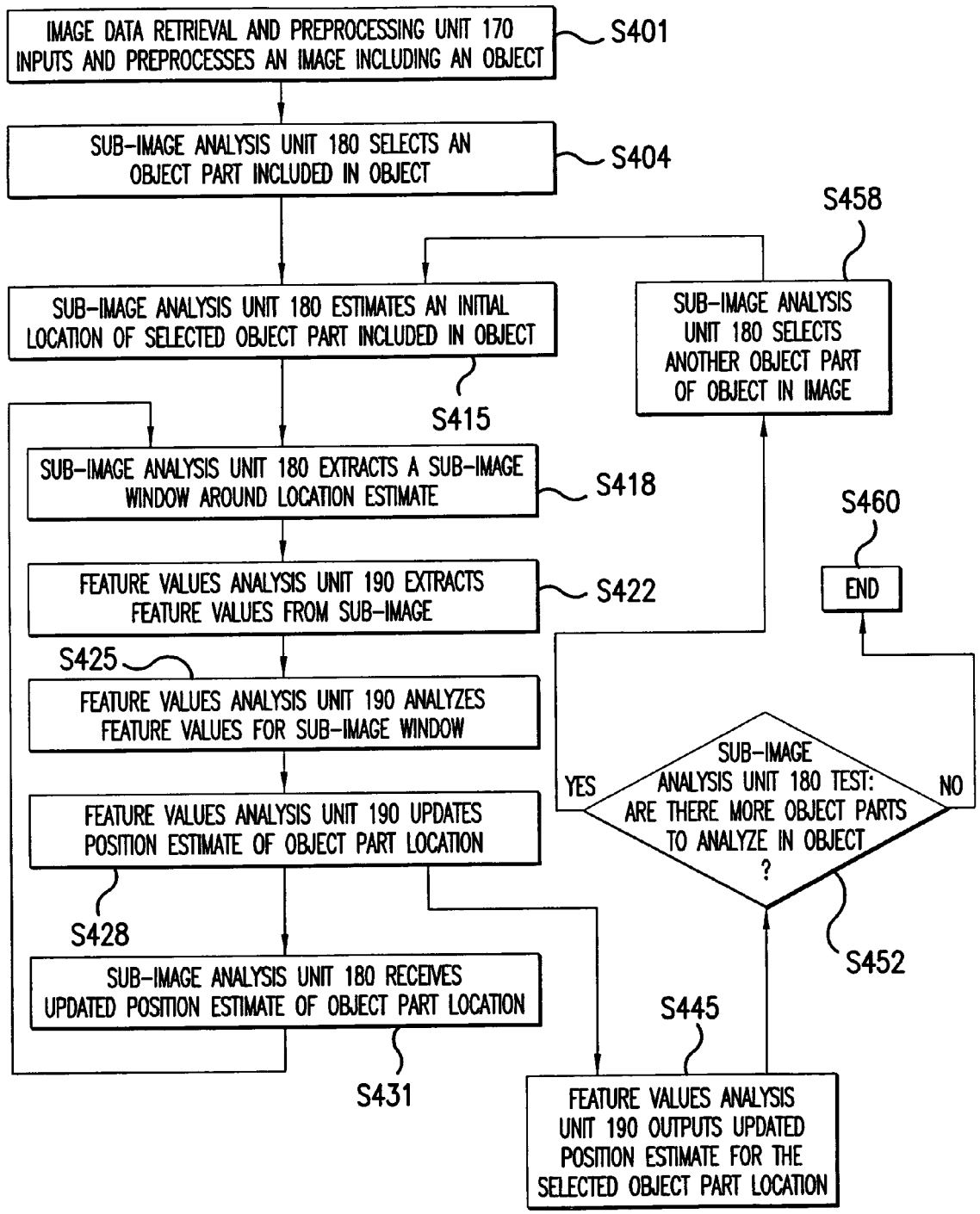
FIG. 3B is a flow diagram illustrating operations performed by an image processing unit for localizing multiple object parts in digital image data according to an embodiment of the present invention illustrated in FIG. 2.

FIG. 3B is a flow diagram illustrating operations performed by an image processing unit 120 for localizing multiple object parts in digital image data according to an embodiment of the present invention illustrated in FIG. 2. Image data retrieval and preprocessing unit 170 inputs and preprocesses an image including an object (S401). The object may include several object parts. Preprocessing operations on the image may include image cropping, rotation, registration, etc. Sub-image analysis unit 180 receives the image including the object and selects one of object parts included in the object (S404). Sub-image analysis unit 180 then estimates an initial location of the selected object part included in the object (S415), and extracts a sub-image window around the location estimate (S418). Feature values analysis unit 190 receives the sub-image from sub-image analysis unit 180 and extracts feature values from the sub-image (S422). Feature values analysis unit 190 then analyzes the extracted feature values for the sub-image window (S425). Based on the feature analysis performed in step S425, feature values analysis unit 190 updates the position estimate for object part location (S428). Feature values analysis unit 190 then sends the updated position estimate for object part location to sub-image analysis unit 180 (S431).

Having received an updated position estimate of the object part location, sub-image analysis unit 180 proceeds to extract a sub-image window around the updated location estimate (S418). Steps S418, S422, S425, S428 and S431 are repeated iteratively to refine the position estimate. The iteration stops when the position estimate is good enough. At that point, feature values analysis unit 190 outputs a final position estimate for the object part location (S445).

Sub-image analysis unit 180 then performs a test to determine if more object parts to analyze are present in the object (S452). If the answer is yes, sub-image analysis unit 180 selects another object part of the object (S458), and estimates an initial location for the newly selected object part (S415). The process of refining the position estimate of the newly selected object part continues iteratively through steps S418, S422, S425, S428 and S431, until an updated position estimate for the object part location is output by feature values analysis unit 190 (S445). Different feature values can be used for estimating positions of different object parts. When all object parts have been analyzed, the algorithm stops (S460). In one implementation, steps S418, S422, S425 and S428 are performed with sub-pixel accuracy.

Figure 4:
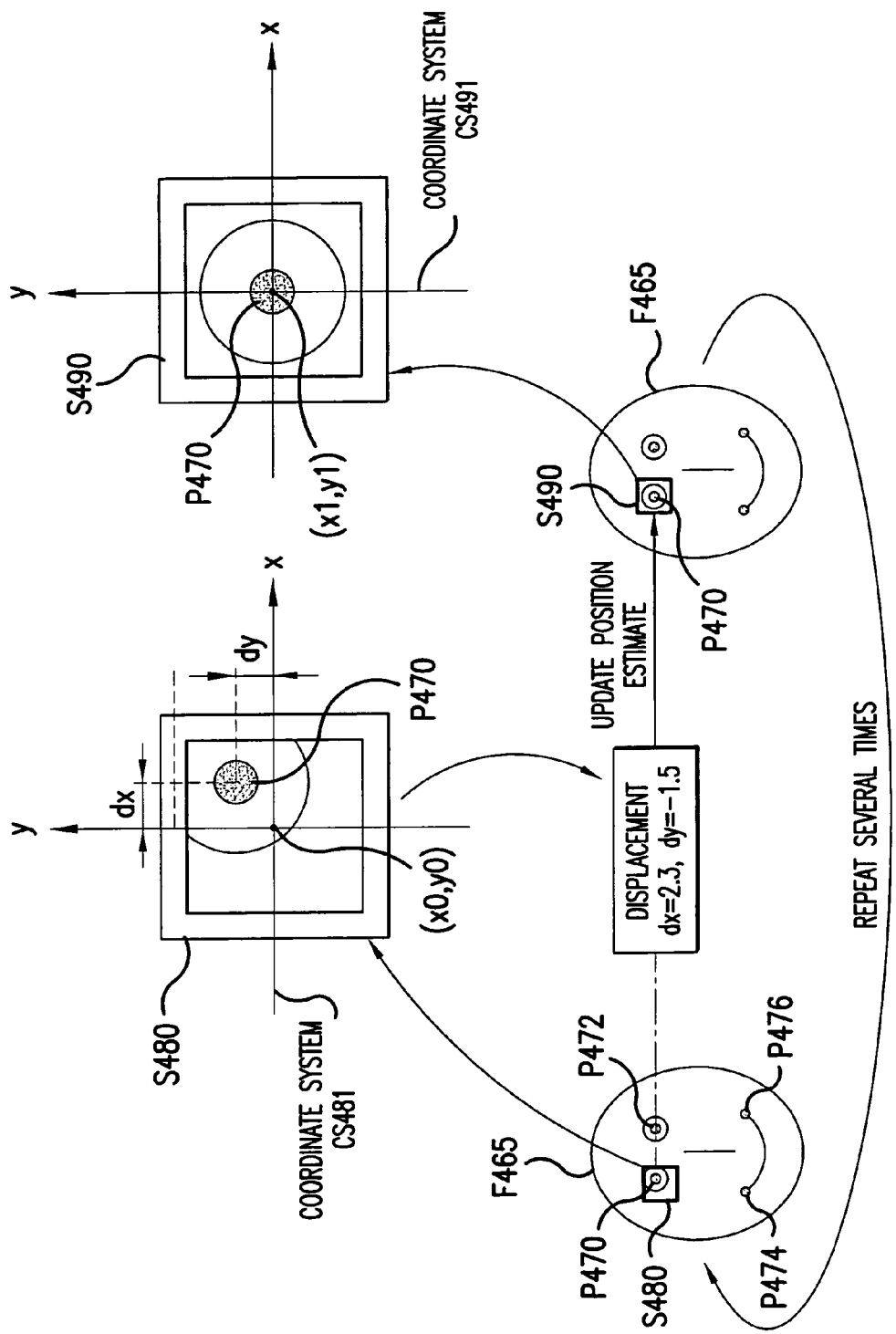
FIG. 4 illustrates aspects of the operation for updating the position estimate of an object part location according to the operations illustrated in the flow diagram of FIG. 3A.

FIG. 4 illustrates aspects of the operation for updating the position estimate of an object part location according to the operations illustrated in the flow diagram of FIG. 3A. FIG. 4 illustrates an exemplary technique for performing steps S325 and S328 in FIG. 3A. A face object F465 includes object parts P470, P472, P474 and P476, which are the left eye, the right eye, the left mouth corner and the right mouth corner respectively. Location of object part P470 is analyzed. For this purpose, an initial location (x0,y0) of object part P470 is estimated, and a sub-image window S480 is extracted around the (x0,y0) location estimate of object part P470. Feature values analysis unit 190 then analyzes feature values for sub-image window S480 and estimates the actual displacements dx and dy of object part P470 with respect to a coordinate system CS481 centered in the center of sub-image S480 at (x0,y0). The displacements are found to be, as an example, dx=2.3 units and dy=−1.5 units in coordinate system CS481. Feature values analysis unit 190 then updates the position estimate of object part P470 to position (x1,y1). A sub-image window S490 is extracted around the new (x1,y1) location estimate of object P470. Feature values analysis unit 190 analyzes feature values again, this time for sub-image window S490, to determine actual displacements dx and dy of object part P470 with respect to a coordinate system CS491 centered in the center of sub-image S490 at (x1,y1). The position estimate of object part P470 can be updated and refined several times by repeating the operations described above.

Figure 5:
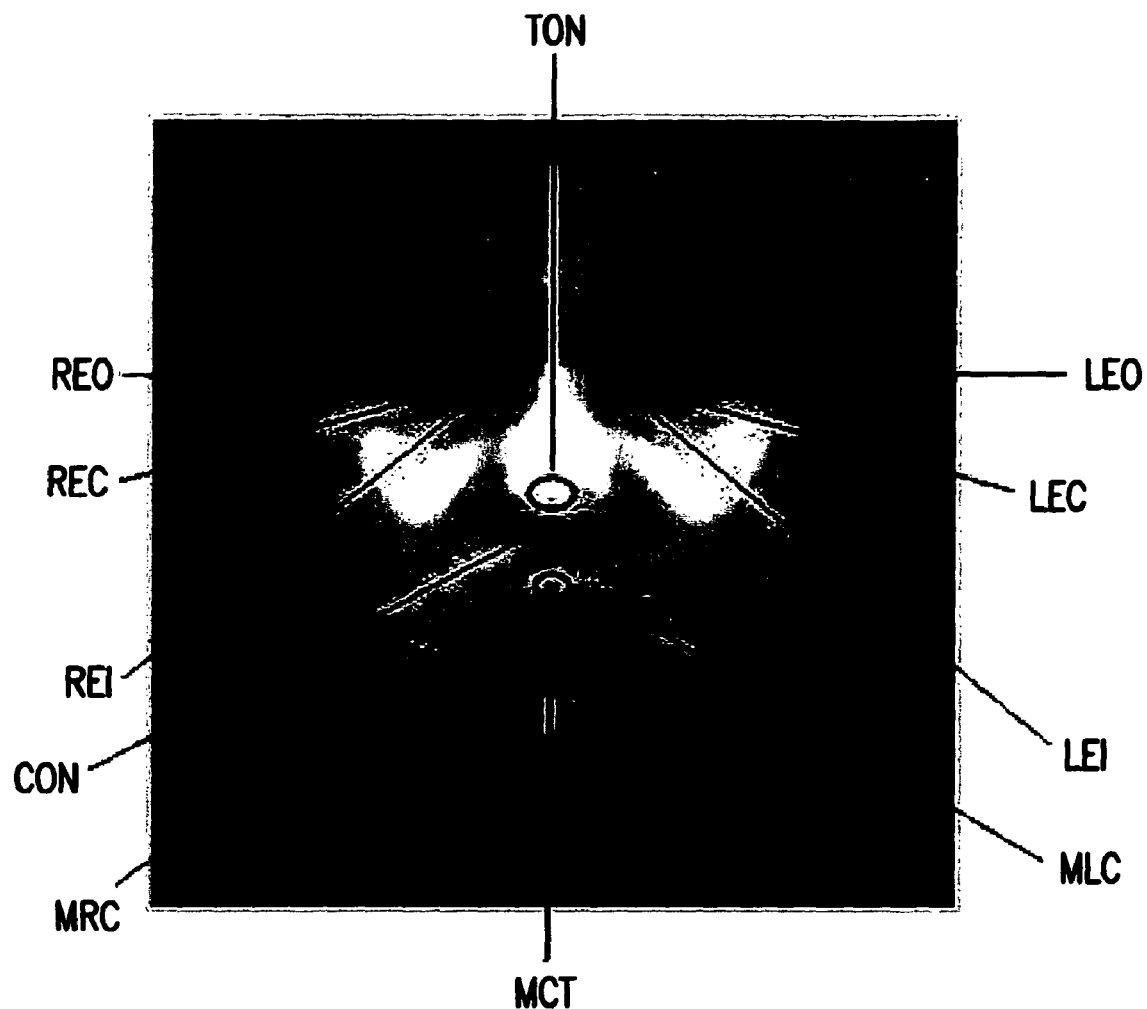
FIG. 5 illustrates an exemplary output of an image processing unit for localizing an object part in digital image data according to an embodiment of the present invention illustrated in FIG. 2.

FIG. 5 illustrates an exemplary output of an image processing unit 120 for localizing an object part in digital image data according to an embodiment of the present invention illustrated in FIG. 2. The input to image processing unit 120 is a face image. Sub-image analysis unit 180 estimates initial locations for object parts belonging to eyes, nose, and mouth of the face. Feature values analysis unit 190 and sub-image analysis unit 180 perform iterations to update the location estimates of the selected object parts. Feature values analysis unit 190 then outputs an image of the face with clearly marked locations for the object parts. The object parts located for the face in FIG. 5 are the Right Eye Outer corner (REO), the Right Eye Center (REC), the Right Eye Inner corner (REI), the Left Eye Outer corner (LEO), the Left Eye Center (LEC), the Left Eye Inner corner (LEI), the Tip of Nose (TON), the Center of Nose (CON), the Mouth Right Corner (MRC), the Mouth Left Corner (MLC), and the Mouth Center Tip (MCT).

Figure 6:
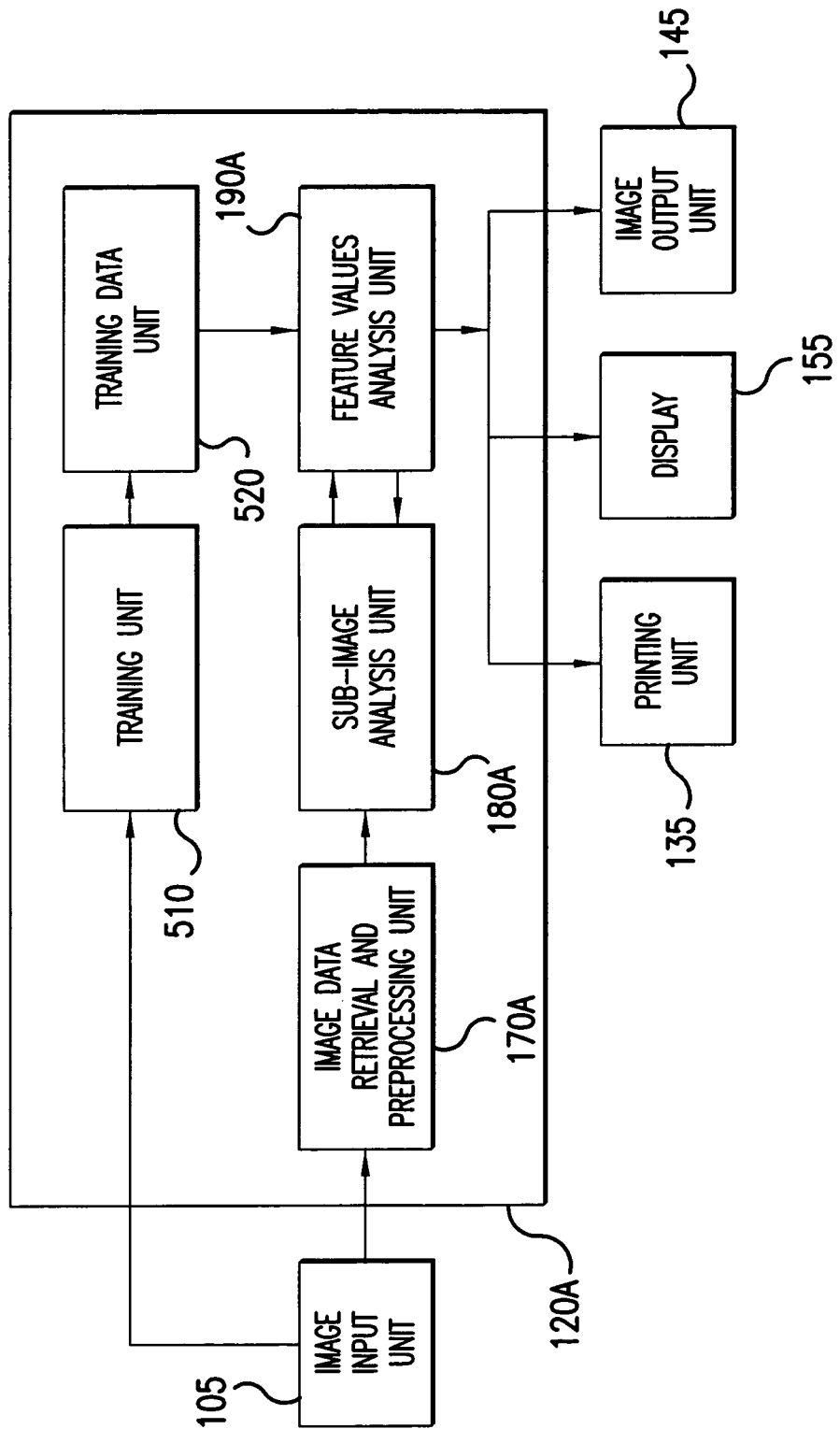
FIG. 6 is a block diagram of an image processing unit for localizing an object part in digital image data using training data according to a second embodiment of the present invention.

FIG. 6 is a block diagram of an image processing unit for localizing an object part in digital image data using training data according to a second embodiment of the present invention. As shown in FIG. 6, the image processing unit 120A includes the following components: an image data retrieval and preprocessing unit 170A; a sub-image analysis unit 180A; a feature values analysis unit 190A; a training unit 510; and a training data unit 520. In accordance with this second embodiment of the present invention, the image data retrieval and preprocessing unit 170A, the sub-image analysis unit 180A, and the feature values analysis unit 190A may function in like manner to the corresponding elements of the first embodiment. In accordance with this second embodiment illustrated in FIG. 6, the training unit 510 trains in estimating object parts locations for one or more types of objects. Training unit 510 also trains in estimating initial object parts locations for one or more types of objects. In one implementation, training unit 510 trains in localizing object parts of human faces. The knowledge accumulated by training unit 510 is stored in training data unit 520.

Operation of the image processing unit 120A can generally be divided into two stages: (1) training; and (2) operation for object part localization. The training stage may be performed using methods described in the cross-referenced related application titled "Method and Apparatus for Estimating Object Part Location in Digital Image Data Using Feature Value Analysis". In accordance with these methods, training unit 510 may use linear discriminant analysis to train in estimating object parts locations. The operation stage of image processing unit 120A is similar to the operation of image processing unit 120 described in FIGS. 3A-3B, with one addition: training data from training data unit 520 is used in steps S322, S325 and S328 in FIG. 3A, and steps S422, S425 and S428 in FIG. 3B. The operation stage of image processing unit 120A may be performed using methods described in the same cross-referenced related application titled "Method and Apparatus for Estimating Object Part Location in Digital Image Data Using Feature Value Analysis".

Figure 7:
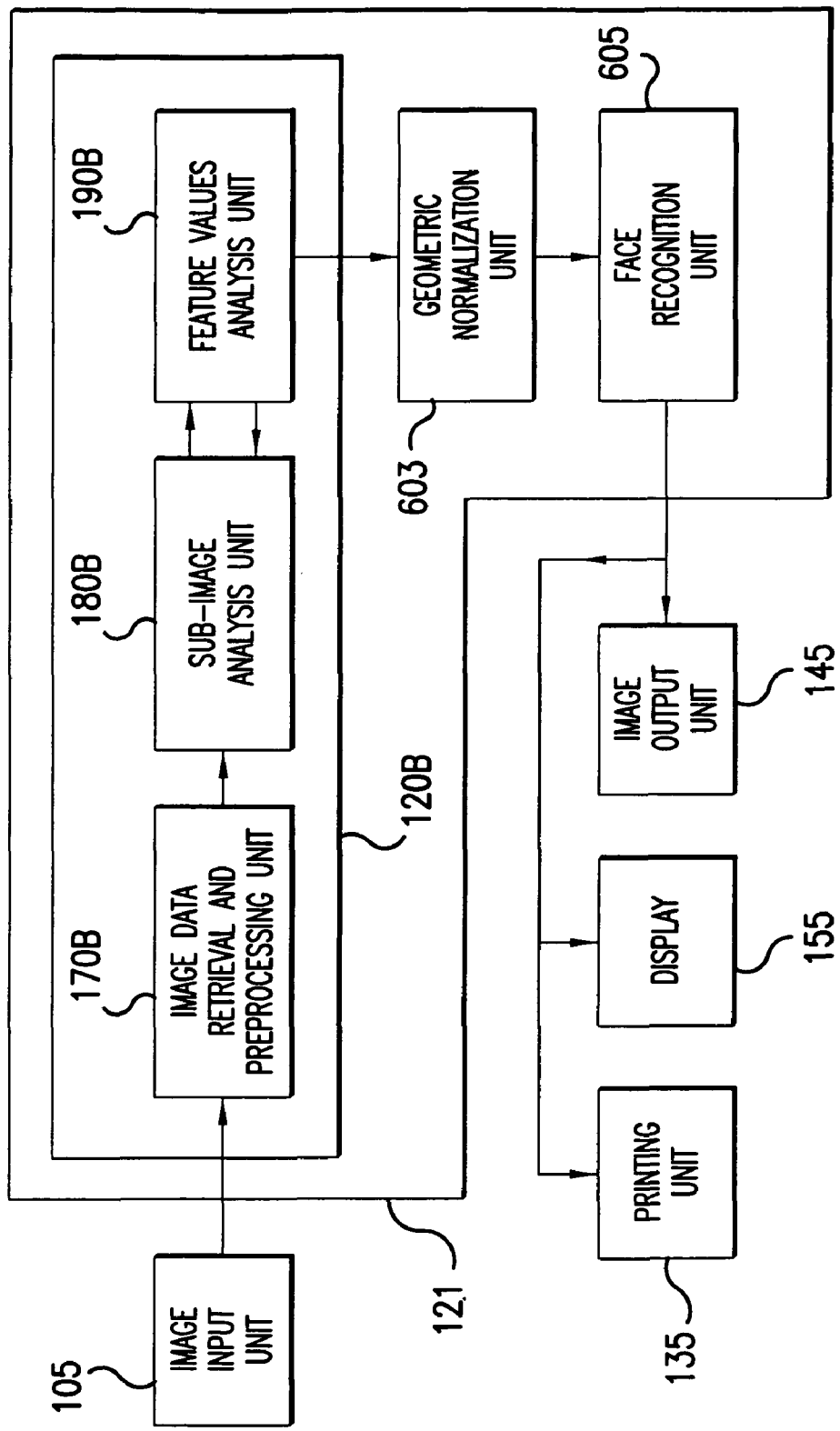
FIG. 7 is a block diagram of a system for performing face recognition including an image processing unit for localizing an object part in digital image data according to a third embodiment of the present invention.

FIG. 7 is a block diagram of a system 121 for performing face recognition including an image processing unit 120B for localizing an object part in digital image data according to a third embodiment of the present invention. System 121 includes: an image processing unit 120B for localizing an object part in digital image data; a geometric normalization unit 603; and a face recognition unit 605. In accordance with this third embodiment of the present invention, the image data retrieval and preprocessing unit 170B, the sub-image analysis unit 180B, and the feature values analysis unit 190B included in image processing unit 120B may function in like manner to the corresponding elements of the first or second embodiment. In accordance with this third embodiment illustrated in FIG. 7, image input unit 105 sends digital image data including faces, to image processing unit 120B, which localizes multiple object part locations. Relevant object parts in face images include eyes corners, mouth corners, nose corners, etc. Individual face images, together with object part location estimates, are output by image processing unit 120B and sent to geometric normalization unit 603, which normalizes the sizes of the images using distances between localized face features (object parts). Geometrically normalized images from geometric normalization unit 603, together with object part location estimates, are sent to face recognition unit 605. Face recognition unit 605 performs face classification of the faces in the images. Face recognition unit 605 outputs face images, together with face identification and/or classification. Such face recognition results may be output to image output unit 153, display 163, and/or printing unit 143.

The embodiments described above can be used for localizing object parts in various technologies. Examples of technologies where the described embodiments can be used are face recognition, ground object recognition such as vehicle recognition, etc.

Although detailed embodiments and implementations of the present invention have been described above, it should be apparent that various modifications are possible without departing from the spirit and scope of the present invention.

I claim:

1. A method of localizing an object part in a digital image by utilizing one or more processors, said method comprising:
   accessing digital image data containing an object part;
   obtaining an initial position estimate which is a region that estimates a location of said object part;
   extracting, using at least one processor, a sub-image window which is larger than said initial position estimate and which surrounds said initial position estimate of said object part location;
   calculating feature values based on pixel values within said sub-image window to estimate a displacement of said object part relative to said initial position estimate;
   determining an updated position estimate for said object part location based on said calculated feature values;
   extracting another sub-image window which is larger than said updated position estimate and which surrounds said updated position estimate of said object part location; and
   determining whether said updated position estimate is a final position estimate for said object part based on feature values calculated for said another sub-image window.

2. The method of localizing an object part in a digital image by utilizing one or more processors as recited in claim 1, wherein said digital image data represents a digital photo.

3. The method of localizing an object part in a digital image by utilizing one or more processors as recited in claim 1, wherein a part of said object part is not contained in said initial sub-image window.

4. The method of localizing an object part in a digital image by utilizing one or more processors as recited in claim 1, further comprising:
   iteratively determining a next updated position estimate for said object part location by performing said extracting step to extract an updated sub-image window around said updated position estimate for said object part location, and performing said calculating step and said determining step using said updated sub-image window to obtain a next updated position estimate for said object part location.

5. The method of localizing an object part in a digital image by utilizing one or more processors as recited in claim 4, further comprising:
   performing said extracting step, said calculating step and said determining step for a plurality of object parts in said digital image data using a plurality of feature values, to obtain a plurality of updated position estimates for said plurality of object parts.

6. The method of localizing an object part in a digital image by utilizing one or more processors as recited in claim 5, further comprising:
   performing geometric normalization of said digital image data using said plurality of updated position estimates for said plurality of object parts in said digital image data.

7. The method of localizing an object part in a digital image by utilizing one or more processors as recited in claim 6, further comprising:
   performing face classification after said step of performing geometric normalization of said digital image data, when said digital image data includes a face and said plurality of object parts are included in said face.

8. The method of localizing an object part in a digital image by utilizing one or more processors as recited in claim 4, further comprising:
   adjusting size and orientation of said digital image data before obtaining said initial position estimate of said object part location in said digital image data.

9. The method of localizing an object part in a digital image by utilizing one or more processors as recited in claim 8, further comprising:
   training in estimating positions for object part locations in training images, to build training knowledge.

10. The method of localizing an object part in a digital image by utilizing one or more processors as recited in claim 9, wherein said training step is performed using linear discriminant analysis.

11. The method of localizing an object part in a digital image by utilizing one or more processors as recited in claim 9, wherein said step of calculating feature values based on pixel values within said sub-image window, and said step of determining an updated position estimate for said object part location based on said calculated feature values use said training knowledge.

12. An apparatus for localizing an object part in a digital image using at least one processor, said apparatus comprising:
   an image data unit in said at least one processor, for providing digital image data containing an object part;
   a sub-image analysis unit in said at least one processor, for extracting object part sub-images from said digital image data, said sub-image analysis unit extracting object part sub-images by
      obtaining an initial position estimate which is a region that estimates a location of said object part, and
      extracting a sub-image window which is larger than said initial position estimate and which surrounds said initial position estimate of said object part location; and
   a feature values analysis unit in said at least one processor, for estimating object part location, said feature values analysis unit estimating object part location by
      calculating feature values based on pixel values within said sub-image window to estimate a displacement of said object part relative to said initial position estimate; and
      determining an updated position estimate for said object part location based on said calculated feature values, wherein
         said sub-image analysis unit extracts another sub-image window which is larger than said updated position estimate and which surrounds said updated position estimate of said object part location; and
         said feature values analysis unit determines whether said updated position estimate is a final position estimate for said object part based on feature values calculated for said another sub-image window.

13. The apparatus according to claim 12, wherein said digital image data represents a digital photo.

14. The apparatus according to claim 12, wherein a part of said object part is not contained in said initial sub-image window.

15. The apparatus according to claim 12, wherein said sub-image analysis unit extracts an updated sub-image window around said updated position estimate for said object part location, and said feature values analysis unit iteratively determines a next updated position estimate for said object part location using said updated sub-image window.

16. The apparatus according to claim 15, wherein said sub-image analysis unit extracts object part sub-images for a plurality of object parts in said digital image data, and said feature values analysis unit estimates a plurality of object part locations for said plurality of object parts, using a plurality of feature values.

17. The apparatus according to claim 16, further comprising: a geometric normalization unit for performing geometric normalization of said digital image data using said plurality of object part locations for said plurality of object parts in said digital image data.

18. The apparatus according to claim 17, further comprising: a face recognition unit for performing face classification, when said digital image data includes a face and said plurality of object parts are included in said face.

19. The apparatus according to claim 15, further comprising: a preprocessing unit for adjusting size and orientation of said digital image data before said sub-image analysis unit receives said digital image data.

20. The apparatus according to claim 19, further comprising: a training unit for training in estimating positions for object part locations in training images, to build training knowledge.

21. The apparatus according to claim 20, wherein said training unit uses linear discriminant analysis.

22. The apparatus according to claim 20, wherein said feature values analysis unit uses said training knowledge.

23. A non-transitory computer readable medium storing a computer program for localizing an object part in a digital image, the computer program when executed causes a processor to perform the steps of:
   providing digital image data containing an object part;
   extracting object part sub-images from said digital image data, said extracting step extracting object part sub-images by
      obtaining an initial position estimate which is a region that estimates a location of said object part, and
      extracting a sub-image window which is larger than said initial position estimate and which surrounds said initial position estimate of said object part location; and
   estimating object part location, said estimating step estimating object part location by
      calculating feature values based on pixel values within said sub-image window to estimate a displacement of said object part relative to said initial position estimate; and
      determining an updated position estimate for said object part location based on said calculated feature values, wherein
         said extracting step extracts another sub-image window which is larger than said updated position estimate and which surrounds said updated position estimate of said object part location; and
         said estimating step determines whether said updated position estimate is a final position estimate for said object part based on feature values calculated for said another sub-image window.

24. The non-transitory computer readable medium according to claim 23, wherein a part of said object part is not contained in said initial sub-image window.

* * * * *